March 17, 1931.  L. E. RUSSELL ET AL  1,796,580
TRUNK RACK
Filed Feb. 25, 1930   3 Sheets-Sheet 1

March 17, 1931.  L. E. RUSSELL ET AL  1,796,580
TRUNK RACK
Filed Feb. 25, 1930    3 Sheets-Sheet 2
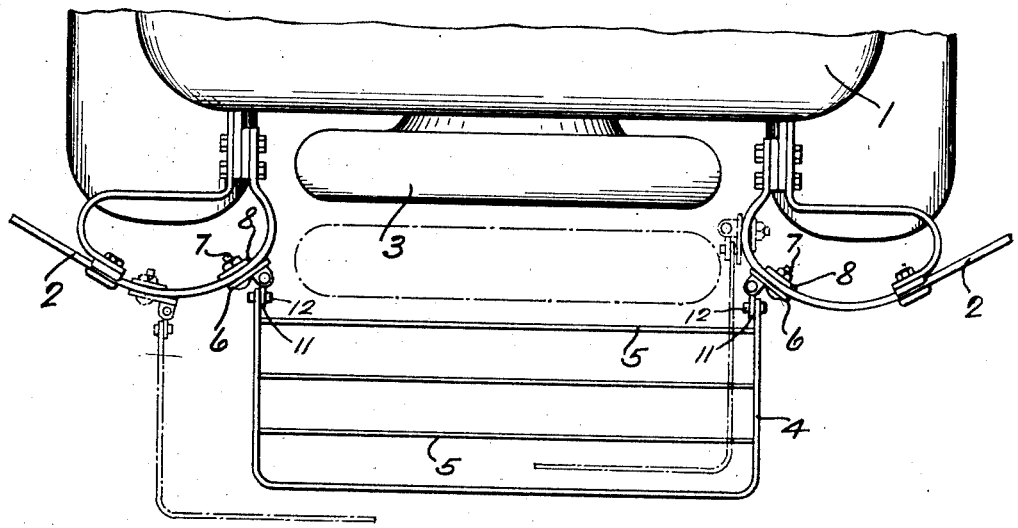
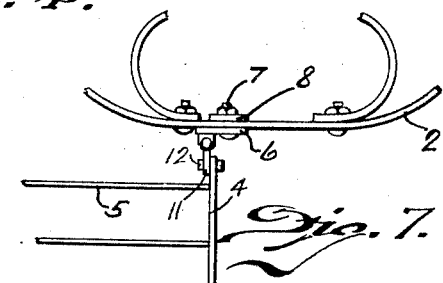
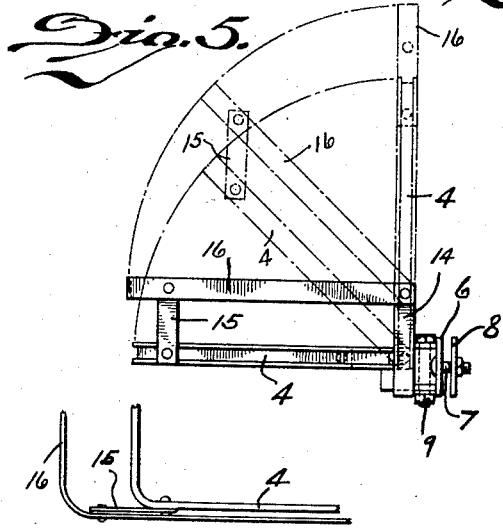
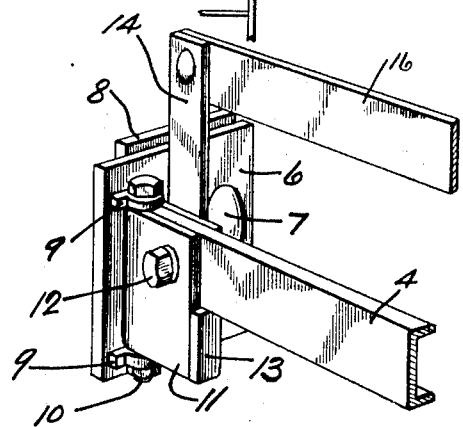

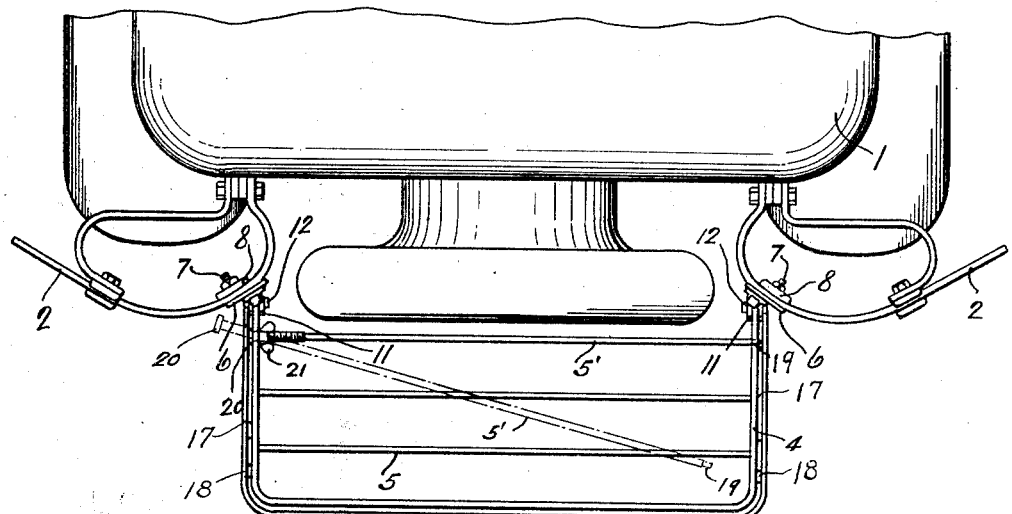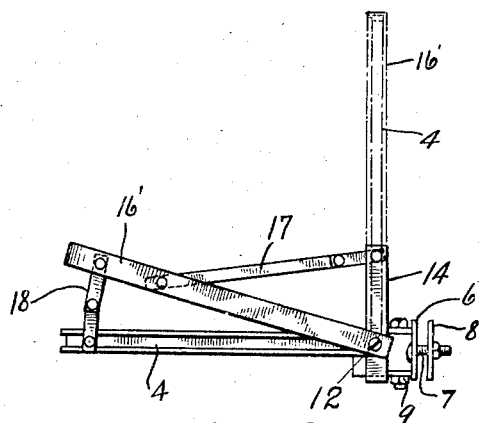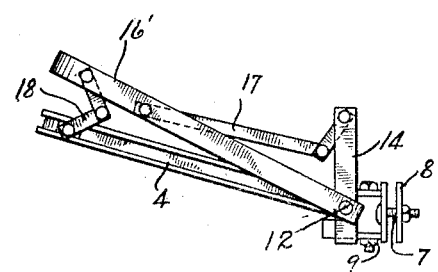

Patented Mar. 17, 1931

1,796,580

UNITED STATES PATENT OFFICE

LINUS E. RUSSELL AND GEORGE E. PETERS, OF SPRINGFIELD, OHIO

TRUNK RACK

Application filed February 25, 1930. Serial No. 431,107.

This invention relates to luggage or trunk carriers for automobiles and more particularly to a folding or retractible rack capable of attachment to vehicle structures of different shapes and designs.

The trunk or luggage rack forming the subject matter hereof is mounted for vertical swinging movement from a horizontal luggage carrying position to a vertical inoperative position and vice versa. While for illustrative purposes the supporting brackets of the swinging rack are shown attached to the rear bumper structure of a motor vehicle, it is to be understood that such brackets may be secured to any suitable or convenient portion of the vehicle.

The attachment brackets for the rack are of universal character capable of attachment to differently disposed supporting surfaces. Each bracket comprises two interpivoted supporting portions capable of relative adjustment about a vertical axis somewhat in the manner of a hinge. One of the interhinged portions is adapted to be fixedly clamped to the vehicle chassis or to the bumper structure as the case may be, while the swinging rack is pivoted on a horizontal axis to the rearwardly extending portion of such universally adjustable bracket. The pivotal connections of the hinge brackets enables them to be adjusted to accommodate themselves to differently inclined supporting surfaces of the vehicle chassis or the bumper bars. The rack supporting portions of the brackets are provided with stop lugs or shoulders which limit the swinging movement of the rack when in its horizontal or luggage carrying position.

The swinging rack is provided with a collapsible rail which, as the rack is raised to its vertical or inoperative position, is retracted substantially into the plane of the rack or carrier. As the rack is lowered to its operative horizontal position the marginal rail is automatically erected.

The object of the invention is to simplify the structure as well as the means and mode of operation of vehicle luggage carriers whereby they will not only be cheapened in construction but will be more efficient in use, positive in operation, uniform in action, capable of being easily and quickly applied to existing vehicles, and unlikely to get out of repair.

A further object of the invention is to provide improved mounting brackets for a luggage carrier having universal application to supporting surfaces of different contour. This enables the carrier rack to be secured not only to surfaces in a common or parallel plane, but also to surfaces which may be inclined relative to each other or to curved surfaces.

A further object of the invention is to provide an improved form of supporting brackets for a swinging carrier having self-contained limiting or stop means.

A further object of the invention is to provide a luggage or trunk carrier provided with a marginal upstanding rail and to provide means whereby such rail will be automatically collapsed substantially into the plane of the rack as the rack is retracted and will be automatically erected by the extension of the rack into operative position.

With the above primary and other incidental objects in view, as will more fully appear in the specification, the invention consists of the features of construction, the parts and combinations thereof and the mode of operation or their equivalents as hereinafter described and set forth in the claims.

Referring to the accompanying drawings wherein is shown the preferred but obviously not necessarily the only form of embodiment of the invention, Fig. 1 is a perspective rear view of a motor vehicle to which the luggage carrier or rack forming the subject matter is applied.

Figure 1:
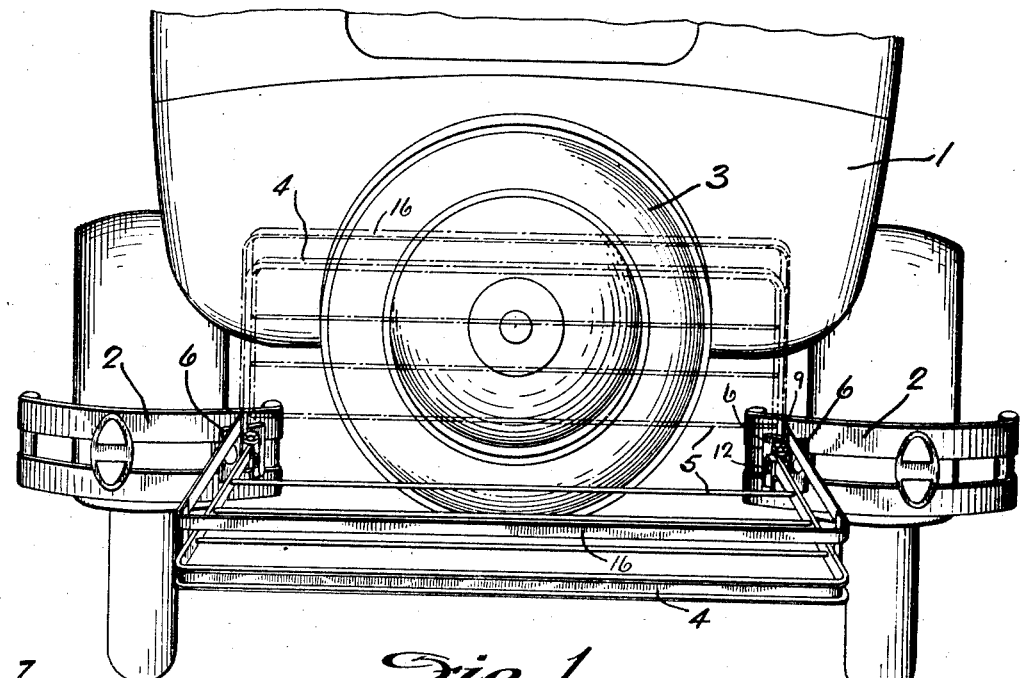
Figure 2:
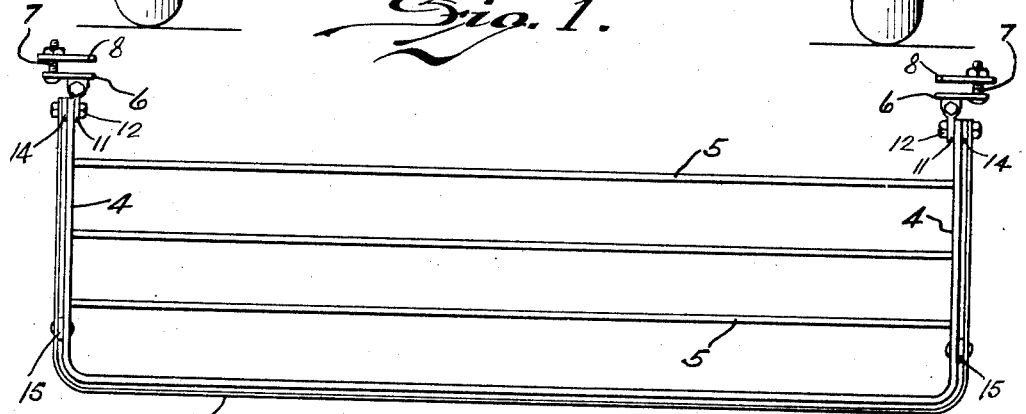
Fig. 2 is a top plan view of the rack or carrier detached from the vehicle.
Figure 3:
Fig. 3 is a rear elevation of the carrier or rack with its marginal protective rail erected.

Fig. 4 is a top plan view illustrating the application of the rack to different portions of an arcuate bumper structure of a motor vehicle, showing the adaptibility of the universal supporting brackets to different portions of the curved bumper bars. This view also illustrates the position of the carrier rack relative to the usual tire carrier upon the rear of a vehicle, showing the clearance afforded for easy removal and replacement of a tire upon the tire carrier.

Fig. 5 is a side elevation of the luggage carrier or rack shown in both its extended and retracted position.

Fig. 6 is a perspective view of one of the supporting brackets and the contiguous portion of the rack or carrier.

Figs. 7 and 8 are detail views.

Fig. 9 is a top plan view and Fig. 10 is an end elevation of a modified form of rack and guard rail. Fig. 11 illustrates the rack partially retracted.

Like parts are indicated by similar characters of reference throughout the several views.

Referring to the drawings, 1 indicates the rear portion of a motor vehicle of which 2—2 are the rear bumpers and 3 the spare tire carried upon the usual tire carrier at the rear of the vehicle.

The rack or carrier comprises a substantially U-shaped frame 4, preferably, though not necessarily, formed from a channel bar, the parallel arms of which are interconnected by transverse parallel spaced rods 5—5 thus forming a supporting platform for the trunk, luggage, or other articles to be carried. This rack is mounted for vertical swinging movement upon a pair of supporting brackets engageable with any suitable or convenient portion of the vehicle structure. In the present instance these supporting brackets have been shown secured to the rear bumpers 2, although it is to be understood that such connection is not an essential feature and that the supporting brackets may be attached to other portions of the vehicle.

The supporting brackets are of universal character whereby they are adaptable to differently disposed supporting surfaces. Each bracket consists of two interpivoted or hinged portions comprising a clamp wing 6 to be fixedly secured to the vehicle by means of a bolt 7 extending therethrough and engaging with a corresponding complementary clamp plate 8. As illustrated in the drawings, the clamp wing 6 of the supporting bracket bears against the outer side of the bumper bars 2 between which the clamp bolt 7 projects into engagement with the complementary clamp plate 8 disposed interiorly of the bumper bars 2 and bearing against the inner faces thereof. The clamp wing 6 carries lugs or ears 9 to receive a pintle or trunnion bolt 10 upon which is mounted the rearwardly extending portion 11 of the bracket to which is pivoted the extremity of the frame bar 4 of the carrier rack. For simplicity and economy of manufacture, the supporting portion 11 of the bracket is formed from heavy sheet metal bent upon itself to parallelism and extending about the pivotal bolt or trunnion 10, as illustrated in Fig. 6. The end of the rack frame 4 extends intermediate the parallel spaced sides of the portion 11 and is interconnected therewith for vertical swinging movement by a transverse pivotal bolt 12. Obviously this portion of the mounting bracket may be otherwise formed as a casting or as a forging. A lug 13 formed upon the supporting portion 11 of the bracket is projected transversely beneath the side arm of the carrier rack 4 to afford a stop or rest limiting the descent of the rack about its pivotal connection upon the stud or bolt 12. The hinge connection of the portions 6 and 11 of the supporting bracket whereby they are capable of pivotal adjustment about the trunnion bolt 10 enables the clamp wing 6 of the bracket to be adjusted to any angular relation with the supporting portion 11 to agree with the curvature or inclination of the bumper bars 2 or to conform to any suitable portion of the vehicle chassis to which the structure is to be attached. This capability of the mounting bracket for universal adjustment is illustrated in detail in Fig. 4 wherein the bracket is shown by dotted lines applied to different portions of the arcuate bumper bars 2.

It is also to be noted in Fig. 4 that by mounting the carrier rack upon the bumper bars 2, ample clearance is afforded between the carrier rack and the spare tire carrier to enable the spare tire to be easily removed without interference.

When the rack is extended for use, the side arms of the frame engage and rest upon the stop lug 13. When not in use the rack is retracted to inoperative position by turning it upwardly about its pivotal connections 12 to an upright vertical position as shown by dotted lines in Fig. 1 and Fig. 5.

To prevent loss and displacement of luggage from the carrier rack, an upstanding marginal rail 16 is provided when the rack is extended. This rail is so connected that it automatically collapses into the plane of the carrier rack as the latter is turned to its vertical inoperative position as shown more particularly in Figs. 1 and 5. To support the marginal rail 16 for automatic operation, arms 14 are rigidly secured to the supporting portions 11 of the bracket, which arms project vertically above the level of the rack when the latter is extended. The ends of the side arms of the U-shaped marginal rail 16 are pivotally connected to the upper ends of the supporting arms 14. At each side of the carrier rack adjacent to its rear portion the marginal rail 16 is supported and interconnected with the carrier rack by swinging links 15 pivotally connected at their lower ends to the frame 4 of the carrier rack and likewise pivotally connected at their upper ends to the marginal rail 16. Due to the interconnection of the marginal rail to the carrier rack by means of the arms 14 and 15, the rail maintains parallel relation with the rack as the latter swings to and fro about its pivotal connection 12. However since the arms 14 are fixedly maintained in vertical position and the swinging carrier when in its upper or retracted position assumes a position in a plane coincident with the arms 14, the marginal rail is likewise retracted into the same plane, the adjustment of the rail being automatically effected.

A modified form of the guard rail adjusting means is illustrated in Figs. 9 and 10 which for many conditions of use is deemed preferable. In this construction the upstanding guard rail 16 is pivoted at the point 12 concentrically with the rack frame 4 whereby the guard rail and rack have swinging motion about a common axis. A folding link 17 connects a mid-length point of the side arm of the guard rail 16' with the upper end of the arm 14 and serves to limit the swinging motion of the guard rail about the pivotal axis 12. Folding links 18 near the rear portion of the rack interconnect the rack frame 4 with the guard rail 16', serving to hold the guard rail in its elevated relation relative to the rack and also assisting in limiting the swinging motion of the rack which is otherwise limited by its engagement with the lugs 13 upon the supporting bracket. Whereas when retracted the guard rail 16 of the construction illustrated in Figs. 1 to 7 is projected a considerable distance above the rack frame 4, as illustrated by dotted lines in Fig. 1, the present modified construction is such that in retracted relation the guard rail 16' will fit closely about the exterior of the rack. When in their retracted or vertical position the guard rail 16' and the rack frame 4 will lie in a common vertical plane. At such time the folding link 17 will be doubled back upon itself. From this position the guard rail and the rack are capable of simultaneous swinging motion about the common pivotal axis 12 toward their horizontal or extended position until the guard rail 16' is limited by the extension of the folding link 17 to its maximum extent. This link 17 thus limits the outward and downward adjustment of the guard rail 16'. The rack 4, however, is permitted a short additional swinging motion independent of the guard rail until limited by the extension of the folding link 18. The link 18 limits the descent of the rack frame 4 relative to the guard rail 16'. The rack, however, is also limited independently of the guard rail by its engagement with the lug 13. Therefore the guard rail 16' and the two folding links 17 and 18 afford an auxiliary support or brace for the rear portion of the cantilever rack.

It will be understood that whatever the inclined or angular positions of the clamp wing 6 of the supporting bracket may be, the supporting portions 11 of the bracket to which the swinging carrier rack is pivotally attached will always extend in fore and aft parallel relation. Due to the interhinged connection, the clamp wings 6 of such brackets may assume any angular position relative thereto necessary to conform to the portion of the vehicle to which such bracket may be attached.

One of the important features of this method of mounting the trunk rack is that the vertical pivotal connection 10 is free to yield to compensate for any fluctuation or distortion of the supporting portion of the vehicle resulting in mis-alinement of the point of attachment, without distortion or straining of the rack or its attachment brackets. For example, in the event that the rack is supported upon a bumper structure, as illustrated in the drawings, the bumper may be bent or deflected by the impact with an obstruction when entering or leaving a parking space or in collision with another vehicle without subjecting the rack itself to undue strain, since the hinge connection 10 is free to yield under such condition and compensate for relative movement or deflection of the points of attachment of the bracket. Thus the vehicle chassis or the bumper structure may yield to impact or to strains without transmitting such strains to the rack due to this flexible connection of the rack with the supporting structure independently of the pivotal connection about which the rack swings to and from operative position.

Trunk racks as ordinarily mounted upon a motor vehicle are quite likely to interfere with and obstruct the removal of a spare tire from the usual tire carrier. The present construction, particularly as illustrated in Fig. 4 affords sufficient clearance between the rack and the tire carrier to permit the easy removal of the tire without interference. However, to facilitate the removal and replacement of spare tires upon the tire carrier, especially in the event that several tires are so carried, the innermost rod 5' forming the supporting platform of the rack may be made releasable from the rack frame 4 as illustrated in Fig. 9. In such construction the rod 5' may be disengaged from the frame 4 and swung out of the way while the tire is being removed and replaced. Instead of entirely detaching the rod from the rack frame, provision is made for retaining engagement so that the rod will not be lost. To this end one extremity of the rod is somewhat reduced as at 19 to form a peripheral shoulder which will abut upon the inner side of the rack frame 4 while the reduced portion or tennon formed on the end of the rod projects through a suitable hole therein. The opposite end of the rod 5' extends through a corresponding hole in the opposite side of the rack frame 4 and is provided with a terminal head 20 which prevents the withdrawal of the rod from the rack frame. The hole through which this end of the rod projects is somewhat larger than the diameter of the rod thereby permitting a considerable degree of play or wobble movement of the rod within such hole. Adjacent to this end of the rod and inwardly from the rack frame 4, the rod is threaded to receive a butterfly clamp nut 21. By tightening the clamp nut 21 against the inner side of the rack frame 4, the rod 5' is thrust longitudinally causing the shoulder 19 at the opposite end of the rod to bear tightly against the opposite side of the rack frame 4. When the butterfly clamp nut 21 is released, it permits the rod 5' to be withdrawn longitudinally a sufficient distance to disengage the reduced end 19 from the rack frame whereupon it may be turned rearwardly transversely of the remaining rods 5 as shown by dotted lines in Fig. 9 to afford an increased clearance space to facilitate removal of the spare tire. The head 20 upon the rod 5' prevents its complete disengagement from the rack.

The construction thus described affords a simple and comparatively inexpensive carrier rack for luggage, universally applicable to vehicles of different design and different style. It is capable of being easily and quickly applied to a vehicle without necessity for special tools, and, as shown in Fig. 4, will readily accommodate itself to different dimensions and different shapes of bumper structures. The provision of the marginal rail 16 insures the safety of luggage or trunks carried upon the rack by preventing them from being jolted from the rack in transit.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred forms of several modes of putting the invention into effect, and the invention is, therefore, claimed in any of its forms or modifications within the legitimate and valid scope of the appended claims.

Having thus described our invention, we claim:

1. A luggage carrier for motor vehicles including a rack mounted for vertical swinging movement, supporting brackets therefor, each of which comprises two interhinged portions disposed in a common horizontal plane and freely adjustable relative to each other about a vertical axis, to one of which portions the swinging rack is pivoted, the other portion being adapted to be fixedly secured to the vehicle structure in any one of various angular positions to accommodate the rack to supporting surfaces, of different curvature or inclination, and stop means on the brackets for limiting the swinging movement of the rack relative thereto.

2. A luggage carrier for motor vehicles including a carrier rack mounted for vertical swinging movement, and a marginal upstanding rail thereabout movable toward and from the rack, and means for effecting the erection and retraction of the marginal rail by the swinging adjustment of the carrier rack.

3. A supporting bracket for a luggage carrier or the like comprising two interhinged leaves disposed for relative adjustment in a common horizontal plane about a vertical axis into any one of various relative angular positions to afford a universal mounting by which the rack is applicable to different inclined or curved supporting surfaces, a horizontal pivotal connection between one of the interhinged leaves and the rack, the other leaf of such hinge bracket being fixedly engageable with a supporting structure, and a stop lug on the bracket to limit the swinging movement of the rack about its pivotal connection.

4. The combination with a swinging luggage carrier rack, of supporting brackets therefor including attachment wings hinged to opposite sides of the rack for free horizontal swinging motion relative to the rack to enable the planes of said attachment wings to approximately conform to differently disposed surfaces to which the brackets are to be attached.

5. The combination with a luggage carrier rack of attachment brackets therefor including attachment wings freely hinged for horizontal swinging adjustment about vertical axes to compensate for relative deflection of the supporting surfaces to which the brackets are to be attached.

6. The combination with a vehicle bumper bar structure of a luggage carrier rack and attachment brackets therefor including rack supporting portions hinged to the rear face of the bumper bar structure for swinging adjustment about vertical axes to enable the rack to freely yield to ununiform deflection of the bumper bar structure, the said carrier rack being pivoted to said supporting portions for swinging movement about a horizontal axis.

7. The combination with a swinging carrier rack of supporting brackets therefor to which the rack is pivoted, a retaining rail normally positioned in elevated position above the level of the rack, arms fixedly attached to the supporting brackets to which the rail is pivotally attached in spaced relation with the pivotal connection of the rack, and swinging links interconnecting the rail and rack in spaced relation with said arms, the swinging movement of the rack being adapted to cause the rack and rail to approach toward and recede from each other.

8. The combination with a luggage carrier rack and supporting brackets on which the carrier is mounted, of a marginal retaining rail normally disposed in substantially parallel spaced relation above the rack, said rail being movable toward and from the rack.

9. The combination with a luggage carrier rack and supporting brackets on which the carrier is mounted, of a marginal retaining rail normally disposed in substantially parallel spaced relation above the rack, said rail being adjustable toward and from the rack and guiding means maintaining the rail in substantially parallel relation with the rack throughout the range of relative adjustment.

10. The combination with a swinging carrier rack and supporting brackets to which the carrier is pivoted, of a marginal retaining rail normally disposed in spaced relation above the rack, said rail being movable toward and from the rack and means for automatically collapsing the rail by the swinging movement of the rack.

11. The combination with a swinging carrier and supporting brackets to which the carrier is pivoted, of a marginal retaining rail normally disposed in elevated relation above the carrier, and pivoted to said brackets, and swinging links connecting the carrier and rail in spaced relation with their connections to said brackets, the carrier and rail being adjustable toward and from each other simultaneously with their swinging adjustment.

12. The combination with a swinging luggage rack for motor vehicles, of spaced supporting brackets therefor each of which comprises two interpivoted portions freely adjustable about a vertical axis, a horizontal pivotal connection between one of the portions and the luggage rack, the other of which is fixedly secured to a supporting portion of the vehicle, and stop means for limiting the swinging motion of the rack, said vertical pivotal connection being adapted to yield to compensate for unequal movement of the supporting portion of the vehicle.

13. The combination with a retractible luggage carrier rack, of a guard rail therefor movable toward and from the rack adjustably supported in spaced relation with the rack when the latter is extended, and a collapsible connection between the rack and rail by which said parts are held in relatively spaced relation when extended and permitted to approach a common plane when retracted and actuating means for effecting automatic retraction of the guard rail toward the rack simultaneously with the retraction of the rack.

14. The combination with a swinging luggage carrier of an adjustable guard rail therefor movable toward and from the carrier, toggle links connecting the rail and rack, and means for automatically adjusting said links by the swinging movement of the rack to effect adjustment of the guard rail relative to the rack.

15. The combination with a retractible luggage rack of an adjustable guard rail therefor movable toward and from said rack and means for effecting automatic adjustment of the guard rail relative to the rack by the extension and retraction of the rack.

16. The combination with a swinging luggage rack of a swinging guard rail therefor, said rail and rack being mounted for relative oscillatory motion about a common axis, a link connecting said pivoted guard rail with a stationary support and limiting the swinging movement of the guard rail in advance of the limitation of the swinging movement of the rack, and a yielding connection between the rack and guard rail limiting the further movement of the rack.

17. The combination with a swinging rack and a swinging guard rail having a common axis of oscillation, said rack and rail being capable of oscillatory movements of different extent, means for limiting the oscillatory movement of the rail while permitting further independent movement of the rack, and interconnecting means between the rack and rail for limiting the further movement of the rack.

18. The combination with a swinging rack and a swinging guard rail having a common axis of oscillation, said rack and rail being capable of oscillatory movements of different extent, said rack and rail being capable of unison oscillation through a given range, the rack being capable of further independent oscillation beyond the limit of such unison movement, and means for limiting the movements of said parts.

19. The combination with a swinging rack and a swinging guard rail having a common axis of oscillation, said rack and rail being capable of oscillatory movements of different extent, a relatively fixed support therefor, a yielding link connecting the rail with the support in spaced relation with the pivotal axis of said rack and rail, and a yielding link connecting the rack with the guard rail.

20. The combination with a motor vehicle having a tire carrier on its rear, of a trunk rack mounted rearwardly of the tire carrier and a releasable supporting rod forming a part of the rack and normally positioned adjacent to the tire carrier, and means for detachably engaging said releasable rod in the rack whereby the rod may be released to afford clearance for removal of a spare tire from the tire rack.

21. The combination with a vehicle bumper structure of a luggage carrier rack flexibly secured to the rear face of the bumper bar structure, and spaced pivotal attachment brackets therefor located adjacent opposite sides of the rack and horizontally adjustable about vertical axes to enable yielding movement of the rack in a horizontal plane to compensate for unequal deflection of the bumper bar structure.

In testimony whereof, we have hereunto set our hands this 21st day of February, A. D. 1930.

LINUS E. RUSSELL.
GEORGE E. PETERS.